United States Patent Office 2,931,797
Patented Apr. 5, 1960

2,931,797
MIXED METHYL GLUCOSIDE-GLYCEROL FATTY ACID ESTER EMULSIFIERS

John P. Gibbons and Louise R. Morrow, Pittsburgh, Pa., assignors to Corn Products Company, a corporation of Delaware No Drawing. Application July 2, 1957
Serial No. 669,443

7 Claims. (Cl. 260—210)

This invention relates to new fatty acid esters and to a process for making such esters. More particularly it relates to mixed methyl glucoside-glycerol partial fatty acid esters and their preparation by the alcoholysis of triglycerides with methyl glucoside. These new esters are nonionic and exhibit highly effective emulsifying properties.

The main object of the invention is the production of mixed methyl glucoside-glycerol partial fatty acid esters by the alcoholysis of triglycerides with methyl glucoside. Other objects will appear hereinafter.

The alcoholysis of one mole of fatty acid triglyceride with two moles of glycerol results in a mixture of fatty acid glycerides, predominantly mono- and diglycerides, which are widely used industrially as nonionic type emulsifiers, particularly in food applications.

Mixed fatty acid mono- and diesters of methyl glucoside (not mixed methyl glucoside-glycerol partial fatty acid esters) have been prepared (1) by the transesterification of a triglyceride (olive oil) with methyl glucoside in the presence of a sodium ethoxide catalyst at 225° C. and 10–20 mm. by distilling glycerol from the reaction mixture (Irvine, J. C. and H. S. Gilchrist, J. Chem. Soc. 125, 1–10 (1925) and (2) by the transesterification of methyl esters of fatty acid and with methyl glucoside in the presence of a sodium hydroxide catalyst at 225° C. by distilling off methanol (Wolff, H., and W. A. Hill, J. Am. Oil Chemists' Soc. 25, 258–260 (1948). The resulting mixed fatty acid mono- and diesters of methyl glucoside obtained by either of these methods have about the same degree of emulsifying properties as the monoglycerides or mixed mono-diglycerides.

The alcoholysis of fatty acid triglycerides with methyl glucoside in the presence of an alkaline catalyst, e.g., sodium ethoxide, does not proceed to any appreciable extent at 225° C. unless a partial vacuum is applied to distill off the glycerol. Therefore, mixed methyl glucoside-glycerol partial esters are not produced when fatty acid triglyceride and methyl glucoside are heated in the presence of an alkaline catalyst at temperatures up to 225° C. and atmospheric pressure.

We have discovered that mixed methyl glucoside-glycerol partial ester products can be produced by the alcoholysis of triglycerides with methyl glucoside at atmospheric pressure in the presence of an alkaline catalyst, provided the reaction is carried out within the temperature range of 235–300° C., and the molar ratio of glyceride to methyl glucoside is within the range of 1:1–2.5. Furthermore, we have discovered that the mixed methyl glucoside-glycerol partial esters produced are excellent emulsifiers, and are decidedly superior in this regard to either high-purity mono-glycerides or to mixed mono-diglyceride fatty acid products, or to mixed mono-diesters of methyl glucoside of similar fatty acid composition.

We have discovered that the emulsifying properties of the mixed methyl glucoside-glycerol fatty acid partial esters are decidedly influenced by the temperature at which the alcoholysis is conducted, by the type of catalyst used and the molar ratio of methyl glucoside to triglyceride employed. The molar ratio should fall within the following range: 1 mole of triglyceride to 1 to 2.5 moles of methyl glucoside.

Triglycerides, such as corn oil, tallow, coconut oil, soybean oil, lard, and tristearin, are of particular value in preparing these mixed methyl glucoside-glycerol partial ester emulsifiers.

Catalysts suitable for effecting alcoholysis of triglycerides with methyl glucoside are the fatty acid soaps, and hydroxides or carbonates of the alkali metals, i.e., lithium, sodium and potassium.

The temperature for alcoholysis should be between 235° C. and 300° C., for optimum results. Below 235° C. very little, if any, alcoholysis occurs, whereas above 300° C. there is risk of losing glycerol through distillation. Using a lithium carbonate catalyst, a minimum temperature of 260° C. has been found satisfactory for carrying out the alcoholysis reaction.

For carrying out a reaction of this type, the reaction vessel should be fitted with a mechanical stirrer, a thermometer for recording temperature, an attachment for blanketing the reaction mixture with an inert gas, and an opening for introducing the methyl glucoside and allowing the inert gas to escape.

The following examples will further illustrate the invention, but are intended to be typical and informative only and in no way limiting the invention.

*Example 1*

This example shows the preparation of a mixed methyl glucoside tallow fatty acid emulsifier and the emulsifying properties of the total reaction product.

Two hundred parts of tallow and 1.5 parts of lithium carbonate (parts by weight) were charged to a reaction vessel equipped with a mechanical stirrer, a thermometer, an inert gas sparging tube and an opening to permit the inert gas to escape and for introducing the methyl glucoside. While stirring under a blanket of carbon dioxide, the contents were heated to 285° C. One hundred parts of methyl glucoside were then added in four portions (25 parts at a time) at 10-minute intervals, taking care not to allow the temperature to fall below 260° C. After the last portion of methyl glucoside was introduced a temperature of 260° C. to 265° C. was maintained for an additional 2.5 hours before allowing the product to cool.

A concentrate was prepared by dispersing a ratio of one part (by weight) of the above reaction product in 7 parts (by weight) of soybean oil with gentle heating. Ten ml. of this concentrate was added to 40 ml. of water in a stoppered graduate cylinder and emulsified by inverting the cylinder ten times. After standing 24 hours at room temperature no oil phase separated at the top of the cylinder and only 1.5 ml. of water at the bottom of the cylinder. Similar concentrates were made by dispersing a ratio of one part (by weight) of either (1) glycerol monooleate (commercial grade, 85 percent monoester and 15 percent diester), (2) glycerol monostearate, (3) cottonseed oil monoglycerides, (4) a mixed mono-diglyceride ester of tallow fatty acids (prepared by a reaction similar to the above using glycerine and tallow), or (5) polyoxyethylene stearate, to 7 parts (by weight) of soybean oil. Ten ml. of each of the above concentrates were then added to 40 ml. of water in a graduate cylinder and emulsified by inverting the cylinder ten times. After 24 hours the following amounts of water separated at the bottom of the cylinder: (1) 40 ml., (2) 34 ml., (3) 35 ml., (4) 40 ml., and (5) 37 ml., respectively.

Example 2

This example shows the emulsifying properties of the methanol-soluble fraction of the product produced in Example 1.

The reaction described in Example 1 was repeated. After the alcoholysis had been completed, the product was cooled to about 120° C. then poured into water. The water phase was separated and the solid reaction product taken up in 1000 parts of methanol, allowed to stand overnight at room temperature, then filtered. After stripping off the methanol, the residue, i.e., the mono-, diester portion, amounting to about 210 parts of a methanol-soluble product was obtained. The water soluble fraction amounted to 10 percent of which 60 percent was methyl glucoside.

A concentrate of a ratio of one part (by weight) of the above methanol-soluble residue dispersed in 7 parts (by weight) of soybean oil was prepared by gentle warming. Ten ml. of this concentrate was added to 40 ml. of water in a graduate cylinder and emulsified by inverting the cylinder ten times. After 24 hours only 1.5 ml. of water separated at the bottom of the cylinder.

Example 3

In an apparatus similar to that described in Example 1, 157 parts of soya oil and 1 part (by weight) of lithium carbonate were heated under a blanket of carbon dioxide to 280° C. and 78.5 parts (by weight) of methyl glucoside were added in four equal portions at 10-minute intervals, taking care not to allow the temperature to fall below 265° C. After the final portion of methyl glucoside was introduced the temperature was held at 265° C. for an additional 3 hours, then cooled. A concentrate was prepared by dispersing 1 part (by weight) of above reaction product in 7 parts (by weight) of soybean oil with gentle warming. Ten ml. of this concentrate was added to 40 ml. of water in a graduate cylinder and emulsified by inverting the cylinder ten times. After standing 24 hours at room temperature no oil phase separated at the top and only 3 ml. of water at the bottom of the cylinder.

Example 4

In an apparatus similar to that described in Example 1, 286 parts of tallow and 0.9 part (by weight) of potassium carbonate were heated to 270° C. under a blanket of carbon dioxide. Methyl glucoside (143 parts by weight) was then added in four equal portions at 10-minute intervals. During the addition of the methyl glucoside, the temperature dropped to 240° C. After the last portion of methyl glucoside had been introduced, the reaction was held at 240–245° C. for an additional 2 hours, then cooled. Ten ml. of concentrate, made by gently warming 1 part (by weight) of the above product with 7 parts (by weight) of soybean oil, was added to 40 ml. of water in a graduate cylinder and emulsified by inverting 10 minutes. After 24 hours at room temperature no oil phase separated at the top and less than 1 ml. of water at the bottom of the cylinder.

Example 5

Three hundred-fourteen parts (by weight) of corn oil and 2 parts (by weight) of lithium carbonate were placed in an apparatus similar to that described in Example 1 and heated under a blanket of carbon dioxide to 280° C. Then 157 parts (by weight) of methyl glucoside were added in four equal portions at 10-minute intervals, taking care not to allow the temperature to fall below 260° C. After the last portion of methyl glucoside had been added, the temperature was held at 265° C. for an additional 2 hours, then cooled. A concentrate was prepared by warming 1 part (by weight) of the above product with 7 parts (by weight) of soybean oil. To 40 ml. of water in a graduate cylinder was added 10 ml. of the concentrate, and the mixture emulsified by inverting the cylinder ten times. After standing 24 hours at room temperature, no oil phase separated at the top and only 5 ml. of water at the bottom of the cylinder.

Example 6

In an apparatus similar to that described in Example 1, 400 parts (by weight) of tallow and 2.0 parts (by weight) of lithium carbonate were heated under a blanket of carbon dioxide to 285° C. Methyl glucoside (97 parts, by weight) was then added in four equal portions at 10-minute intervals. After the last portion of the methyl glucoside had been introduced, the temperature was held at 265° C. for an additional 2.5 hours, then cooled. The water soluble portion of the reaction product was 3 percent of which 67 percent was methyl glucoside. The methanol soluble portion (mono-diester portion) amounted to 57–59 percent of the charge. Ten ml. of concentrate, made by gently warming 1 part (by weight) of the above product and 7 parts (by weight) of soybean oil, was added to 40 ml. of water in a graduate cylinder and emulsified by inverting 10 times. After 24 hours at room temperature no oil phase separated at the top and 6 ml. of water at the bottom.

Example 7

In an apparatus similar to that described in Example 1, 400 parts (by weight) of tallow and 2.2 parts (by weight) of lithium carbonate were heated to 290° C. under a blanket of carbon dioxide. Methyl glucoside (155 parts) was added in four equal portions at 10-minute intervals. After the last of the methyl glucoside was added, the temperature was held at 265° C. for an additional 2.5 hours, then cooled. A concentrate was prepared by gently warming 1 part (by weight) of the above reaction product with 7 parts by weight of soybean oil. Ten ml. of concentrate was added to 40 ml. of water in a graduate cylinder and emulsified by inverting the cylinder 10 times. After standing 24 hours at room temperature, no oil phase separated at the top and only 1 ml. of water at the bottom.

Example 8

In an apparatus similar to that described in Example 1, 400 parts (by weight) of tallow and 6.4 parts (by weight) of sodium stearate were heated to 295° C. under a blanket of carbon dioxide. Methyl glucoside (242 parts, by weight) was added in four equal portions at 10-minute intervals. After the final portion of methyl glucoside was introduced the temperature was held at 265° C. for an additional hour, then cooled. A concentrate was prepared by dispersing 1 part by weight of the above reaction product in 7 parts (by weight) of soybean oil with gentle warming. Ten ml. of this concentrate was added to 40 ml. of water in a graduate cylinder and emulsified by inverting ten times. After standing 24 hours at room temperature no oil phase separated at the top and only 6 ml. of water at the bottom of the cylinder.

We claim:

1. A process for preparing mixed methyl glucoside-glycerol partial fatty acid esters which comprises reacting triglycerides with methyl glucoside in the presence of an alkaline catalyst at a temperature between about 235° C. and 300° C.; the molar ratio of triglyceride to methyl glucoside being 1:1–2.5.

2. Process according to claim 1 wherein the triglyceride is tallow.

3. Process according to claim 1 wherein the triglyceride is soya oil.

4. Process according to claim 1 wherein the triglyceride is corn oil.

5. Process according to claim 1 wherein the triglyceride is coconut oil.

6. Process according to claim 1 wherein the triglyceride is tristearin.

7. The product produced by the method of claim 1.

References Cited in the file of this patent

Goldsmith: Chemical Reviews, vol. 33 (1943), pp. 268–269.

Wolff et al.: J. Am. Oil Chem. Soc., July 1948, vol. 25, pp. 258–260.